United States Patent
Drusch et al.

(10) Patent No.: US 12,171,244 B2
(45) Date of Patent: Dec. 24, 2024

(54) CONSUMABLE EMULSION

(71) Applicant: Symrise AG, Holzminden (DE)

(72) Inventors: Stephan Drusch, Berlin (DE);
Christina Linke, Holzminden (DE);
Maria Schwippl, Berlin (DE)

(73) Assignee: Symrise AG, Holzminden (DE)

(*) Notice: Subject to any disclaimer, the term of this patent is extended or adjusted under 35 U.S.C. 154(b) by 604 days.

(21) Appl. No.: 15/999,678

(22) PCT Filed: Feb. 19, 2016

(86) PCT No.: PCT/EP2016/053538
§ 371 (c)(1),
(2) Date: Aug. 17, 2018

(87) PCT Pub. No.: WO2017/140376
PCT Pub. Date: Aug. 24, 2017

(65) Prior Publication Data
US 2019/0133145 A1    May 9, 2019

(51) Int. Cl.
| | | |
|---|---|---|
| A23D 7/05 | (2006.01) |
| A23C 11/04 | (2006.01) |
| A23D 7/00 | (2006.01) |
| A23D 7/005 | (2006.01) |
| A23L 2/52 | (2006.01) |
| A23L 2/54 | (2006.01) |
| A23L 2/56 | (2006.01) |
| A23L 2/62 | (2006.01) |

(Continued)

(52) U.S. Cl.
CPC ............... *A23D 7/05* (2013.01); *A23C 11/04* (2013.01); *A23D 7/003* (2013.01); *A23D 7/0053* (2013.01); *A23L 2/52* (2013.01); *A23L 2/54* (2013.01); *A23L 2/56* (2013.01); *A23L 2/62* (2013.01); *A23L 23/00* (2016.08); *A23L 23/10* (2016.08); *A23V 2002/00* (2013.01)

(58) Field of Classification Search
CPC ... A23L 2/62; A23L 29/25; A23L 2/38; A23L 1/053; A23D 7/05; A23D 1/003; A23D 7/003

See application file for complete search history.

(56) References Cited

U.S. PATENT DOCUMENTS

| | | |
|---|---|---|
| 4,529,606 A | 7/1985 | Fustier et al. |
| 5,194,284 A | 3/1993 | Chiu et al. |

(Continued)

FOREIGN PATENT DOCUMENTS

| | | |
|---|---|---|
| EP | 0108594 A2 | 5/1984 |
| FR | 2823646 A1 | 10/2002 |

(Continued)

OTHER PUBLICATIONS

Garti et al., "A clouding agent based on modified soy protein," International Journal of Food Science and Technology (1991) 26(3), pp. 259-270.

*Primary Examiner* — Patricia A George
(74) *Attorney, Agent, or Firm* — Dilworth & Barrese, LLP

(57) ABSTRACT

Suggested is a consumable emulsion, comprising: (i) 3 wt. % to 12 wt. % long chain triglycerides, (ii) 97 wt. % to 70 wt. % water, (iii) 0.013 wt. % to 20 wt. % additives, wherein the weight percent of the components i) to iii) are based on the total amount of the emulsion, and wherein the emulsion is free from weighting agents.

6 Claims, 2 Drawing Sheets turbidity depending on the melting point of the triglycerides

(51) Int. Cl.
    *A23L 23/00*     (2016.01)
    *A23L 23/10*     (2016.01)

(56) References Cited

U.S. PATENT DOCUMENTS

| | | | |
|---|---|---|---|
| 8,372,465 B2 * | 2/2013 | Nakhasi | A23D 9/02 |
| | | | 426/606 |
| 2002/0155211 A1 * | 10/2002 | Yokoo | A23L 2/02 |
| | | | 426/599 |
| 2008/0160151 A1 * | 7/2008 | Zeller | A23F 5/465 |
| | | | 426/569 |
| 2009/0297491 A1 * | 12/2009 | Bromley | A61K 36/286 |
| | | | 424/94.1 |
| 2009/0317532 A1 * | 12/2009 | Bromley | A23L 33/11 |
| | | | 426/590 |

FOREIGN PATENT DOCUMENTS

| | | |
|---|---|---|
| WO | 97/03576 A1 | 2/1997 |
| WO | 97/21360 A1 | 6/1997 |

* cited by examiner

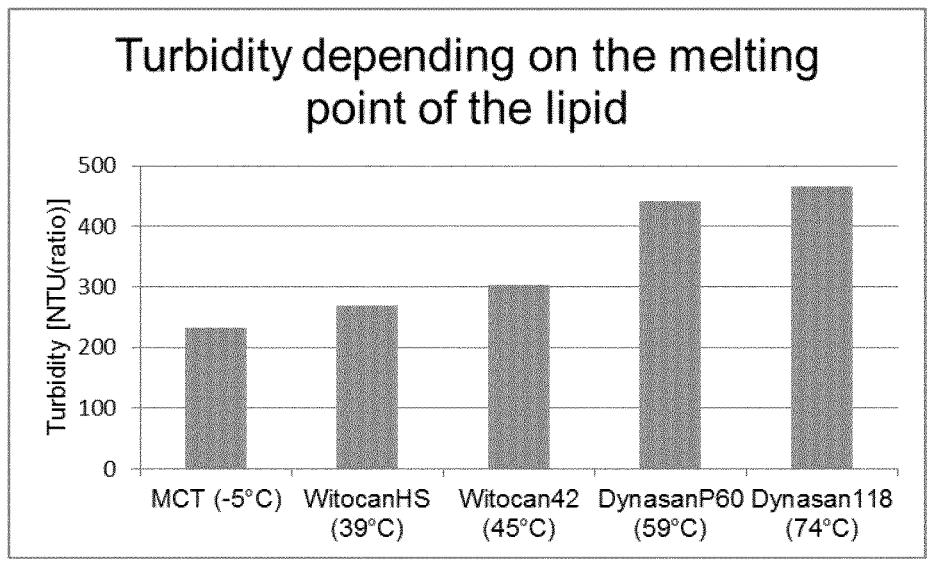
Figure 1: turbidity depending on the melting point of the triglycerides
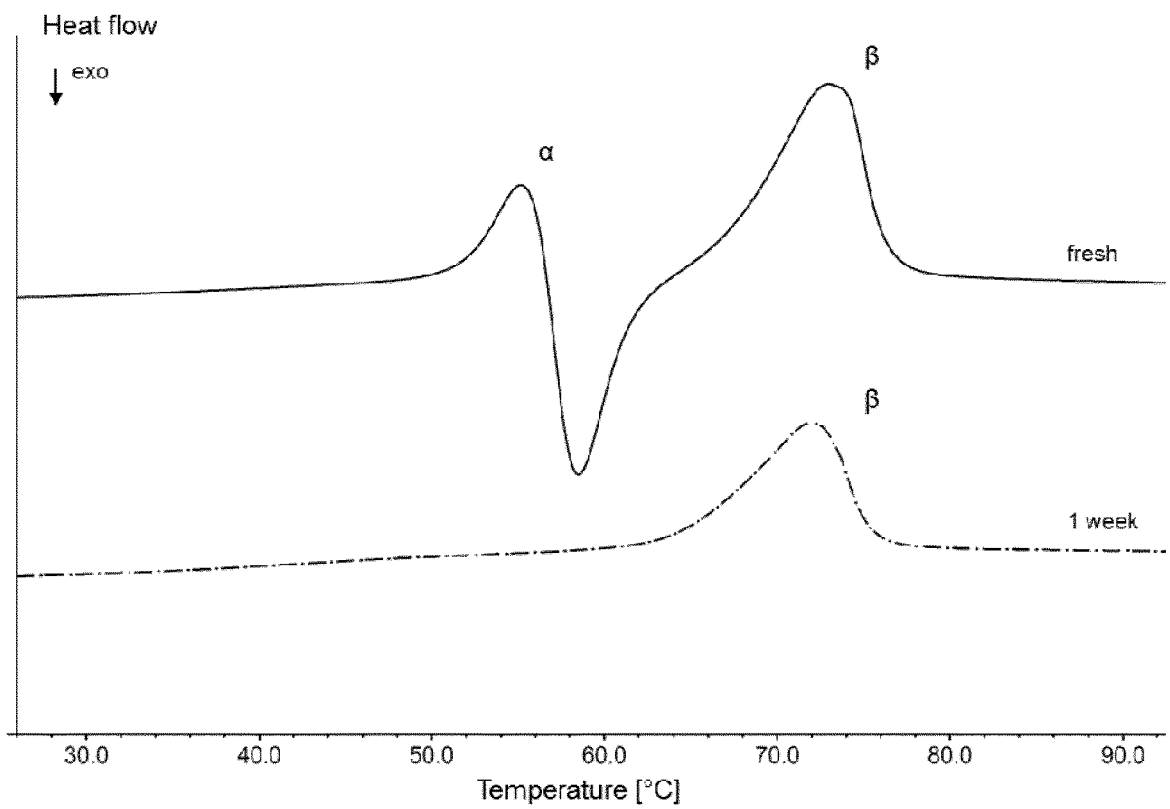
Figure 2: Melting curves of D118 dispersion depending on the time, cooling temperature 20°C, storage temperature 20°C

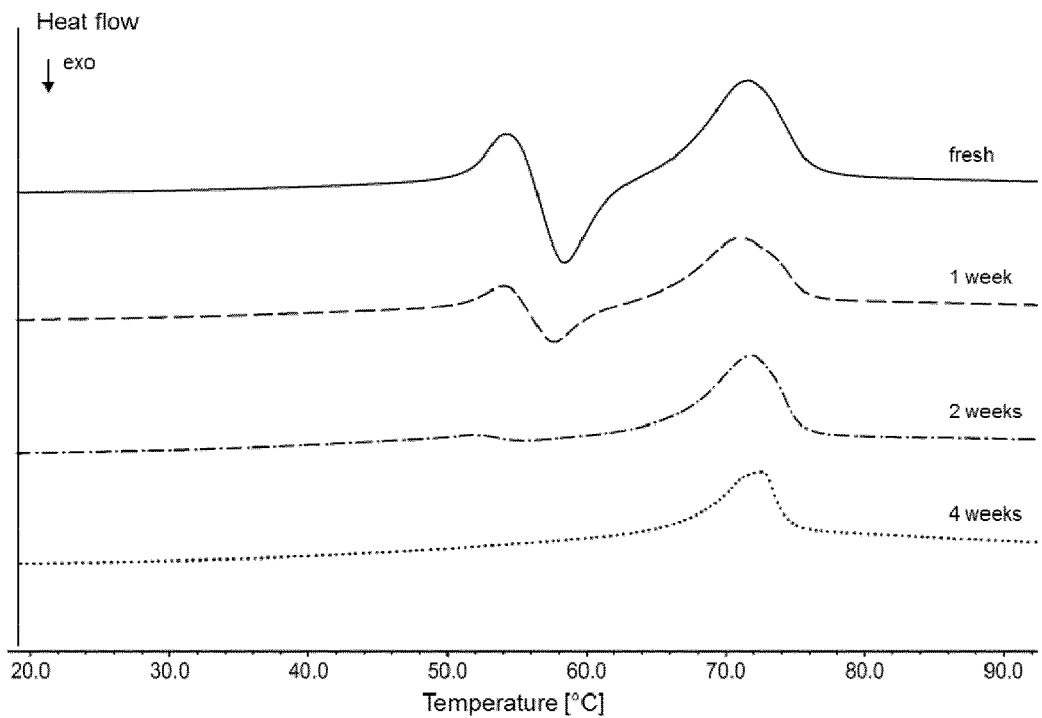
Figure 3: Melting curves of D118 dispersion depending on the time, cooling temperature 4°C, storage temperature 20°C
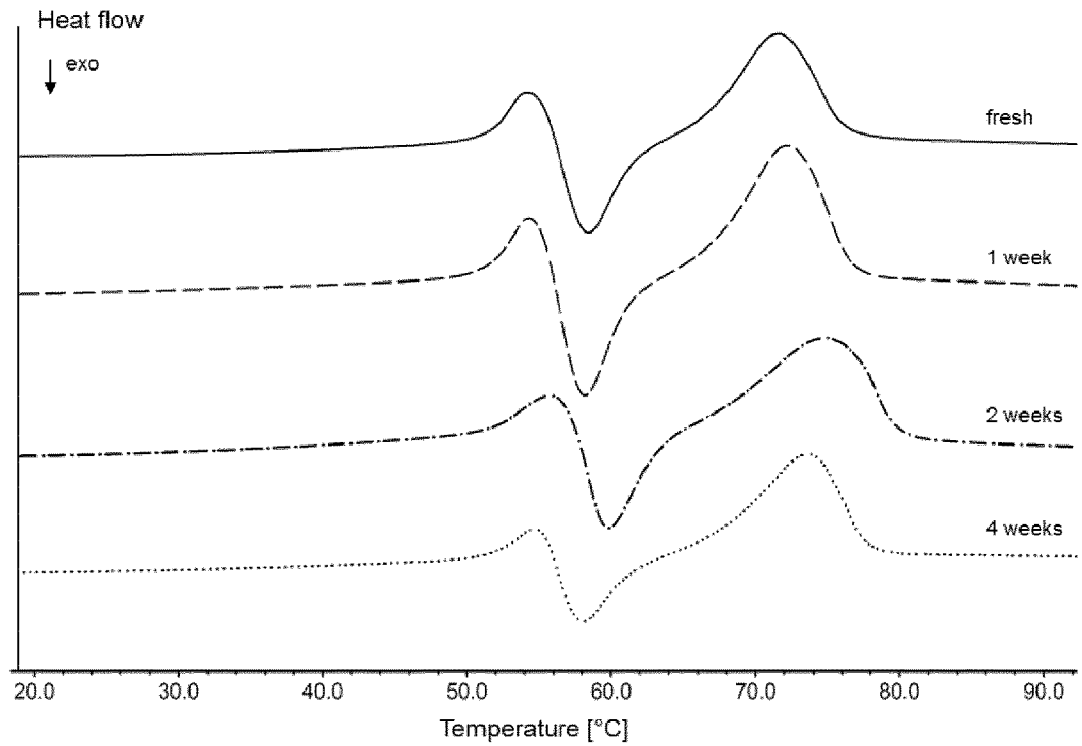
Figure 4: melting curves of D118-dispersions depending on time, cooling temperature 4°C, storage temperature 4°C

CONSUMABLE EMULSION

FIELD OF INVENTION

The present invention belongs to the area of emulsions for foodstuffs and beverages and their use and method of preparation.

STATE OF THE ART

Beverages with a cloudy appearance are known. Thus, in soft drinks, the turbidity is achieved by dispersing flavour oils or a water-immiscible liquid which cause turbidity, such as edible oil. The degree of turbidity is an important parameter reflecting the quality of a cloudy fruit juice. Therefore the visual appearance of a cloudy drink is a critical factor for consumer acceptance.

This kind of system of very finely dispersed oil droplets in water is referred to as an emulsion. An emulsion is a thermodynamically unstable 2-phase system. Physical processes that describe this destruction of an emulsion are creaming, sedimentation, flocculation and coalescence of oil droplets. These processes can overlap in time. Usually, flocculation precedes coalescence of creaming.

An emulsion is physically stable, when within the required shelf life no separation of the dispersed system is observable, e.g. creaming in the area of the bottleneck or sedimentation at the bottom of the bottle of a beverage. Parameters that determine the physical stability of the emulsion in the final e.g. beverage are the density difference between continuous and dispersed phase, the phase volume of the dispersed phase in the final beverage and the size of the particles in the disperse phase. In practice, however, it is difficult to produce stable beverage emulsions solely by emulsifying the flavouring oils to the beverage, because the flavour oils and the water phase differ significantly in density. The greater the density difference and the particle size of the dispersed phase, the faster creaming or phase separation occurs. Due to their lower specific density, the flavour oils tend even at very fine distribution to cream and deposit on the surface of the liquid-resistance, which can lead to the formation of an annular deposit in the bottleneck, the "oil collar". Such deposits make the drink shabby, and also lead to flavour changes in the drink.

To avoid such deposits, the emulsions must be stabilized. One way to stabilize an emulsion in beverages is done in the prior art through the use of water-soluble stabilizers, such as amphiphilic polysaccharides, modified starches or gum arabic and partly through oil-in-water emulsifiers. Another option is the use of so-called weighting agents.

Weighting agents are not water but oil-soluble. Weighting agents increase the density of the oil phase and therefore contribute to the stabilization of an emulsion through minimization of the difference in density between the different phases. A typical weighting agent is the glycerol ester of wood rosin (glyceryl abietate).

EP 1151677 A1 deals with emulsion-based drink which has an aqueous phase and a dispersed oil phase. The stability of the emulsion-based drink is achieved through a combined adjustment of dispersed oil phase, viscosity and density difference of particle size and particle size distribution. Weighting agents are also used for stabilization.

EP 2025250 B1 refers to creaming-resistant consumable emulsion, comprising water, modified starch, terpene oil and weighting agents. The weighting agents are also used to stabilize the oil-phase in the emulsion.

U.S. Pat. No. 8,318,233 B1 discloses emulsions useful in beverages with a discrete volume fraction of 60% to 67% comprising low molecular weight (LMW) surfactant and having a mean particle size less than 0.2 microns. The LMW is selected from the group consisting of quillaja solid extract and/or polysorbate. Weighting agents are also used for stabilization.

Accordingly, an object of the present invention was to provide emulsions suitable for use in the preparation of cloudy beverages or foodstuff, particularly to induce turbidity in those beverages and foodstuffs. Another object of the invention was to provide such kinds of emulsions for beverages and foodstuffs, which are preferably free of off-taste or bitterness, and thus does not influence the olfactory taste of the end product. In particular, further object was to provide stable creaming-resistant beverages therefrom.

BRIEF DESCRIPTION OF THE SEVERAL VIEWS OF THE DRAWINGS

The invention will now be described in greater detail with reference to the accompanying FIGS. 1-4 which illustrates in:

FIG. 1: a bar graph of the turbidity based on the melting point of various triglycerides;

FIG. 2: a graph of the melting curves of D118 dispersion depending on the time, cooling temperature 20° C., storage temperature 20° C.;

FIG. 3: a graph of the melting curves of D118 dispersion depending on the time, cooling temperature 4° C., storage temperature 20° C.; and, FIG. 4: a graph of the melting curves of D118-dispersions depending on time, cooling temperature 4° C., storage temperature 4° C.

DESCRIPTION OF THE INVENTION

The object has been solved by a consumable emulsion, comprising:
 i) 3 wt. % to 12 wt. % long chain triglycerides,
 ii) 97 wt. % to 70 wt. % water, and
 iii) 0.013 wt. % to 20 wt. % additives,
wherein the amounts of the components i) to iii) are based on the total amount of the emulsion, and wherein the emulsion is essentially free from weighting agents.

Surprisingly, the emulsion of the present invention provides stable and a high turbidity.

The term "essential free from weighting agents" in the sense of the present invention means that the consumable emulsion does not contain any kind of weighting agents. Essentially free of weighting agents means in particular that the content of weighting agents in the consumable emulsion is less than 1 wt. %, preferably less than 0.5 wt. %, more preferred less than 0.01 wt. %.

In a preferred embodiment the long chain triglycerides in emulsion of the present invention are triglycerides of long chain fatty acid residues derived from fatty acids having from 14 to 22 carbon atoms, and derived from non-hydrogenated, partially hydrogenated or fully hydrogenated oils such as soybean, safflower, sunflower, high oleic sunflower, sesame, peanut, corn, olive, rice bran, babassu nut, palm, mustard seed, cottonseed, poppyseed, low or high erucic rapeseed, shea, marine, meadowfoam, tallow, lard, shea butter, dairy butter, jojoba and mixtures thereof.

In particular suitable long chain triglycerides for the emulsions of the present invention derived from any synthetic or natural, straight or branched, saturated or unsaturated, organic acid including, but no limited to palmitic (hexadecanoic), stearic (octadecanoic), arachidic (eicosanoic), behenic (docsanoic), lignoceric (tetracosanoic), cerotic (hexacosanoic), montanic (octacosanoic), melissic (triaconanoic) and also be derived by hydrogenating an unsaturated acid, including, but not limited to palmitoleic (9-hexadecenoic), oleic (cis 9-octadecenoic), elaidic (trans-9-octadecenoic), vaccenic (trans-11-octadecenoic), linoleic (cis, cis-9,12-octadecenoic), linolenic (9,12,15-octadecatrienoic and 6,9,12-octadecatrienoic), eleostearic (9,11,13-octadecatrienoic), arachidonic (5,8,11,14-eicosatetraenoic), nervonic (cis-15-tetracosenoic), eicosapentanoic, docosatetraenoic, docosapentaenoic, docosahexaenoic acids, and mixtures thereof.

Emulsions comprising the mentioned long chain triglycerides have the advantage of providing in particular high specific turbidity in contrast to lower chain triglycerides, particularly contrary to C6 to C12 triglycerides.

Furthermore, surprisingly, it has been found that the long chain triglycerides used in the consumable emulsions, in which there are no weighting agents at all, are most preferred.

Particular preference is therefore made to emulsions, wherein the triglycerides are a mixture of triglycerides of fatty acids having 14 to 18 carbon atoms. Thus a preferred embodiment is an emulsion according to the present invention, wherein the triglycerides are selected from the group of fatty acids consisting of
  a) C18, or
  b) C16:C18 in the ratio of 45:55, or
  c) C14:C16:C18 in the ratio of 1:44:53, or
  d) C14:C16:C18:C20 in the ratio of 2:30:67:1, or
  e) C18:C20:C22 in the ratio 3:3:94, or
  f) C20 and higher, or
  g) Beeswax, or
  h) Vanilla wax, or
  j) Shellac, or
  k) Carnauba wax, or
  and mixtures thereof.

Emulsions comprising the mentioned ratio of specific triglycerides are in particular advantageously in their character of high specific turbidity and thus are preferably suitable to be included in cloudy beverages or foodstuffs.

Preferably the triglycerides selected from the group of fatty acids consisting of C18 are a tristearate, C14:C16:C18 is hydrogenated palm oil.

Suitable additives for the emulsion in the sense of the present invention are preferably selected from preservatives, surfactants and acidulants.

Thus, preferred embodiments are directed to a consumable emulsion, comprising:
  i) 3 wt. % to 12 wt. % long chain triglycerides, which is preferably selected from fatty acids
    a) C18, or
    b) C16:C18 in the ratio of 45:55 (wt. %),
  ii) 97 wt. % to 70 wt. % water, and
  iii) 0.013 wt. % to 20 wt. % additives, which are preferably selected from preservatives, surfactants, acidulants and emulsifiers;
  wherein the amounts of the components i) to iii) are based on the total amount of the emulsion, and wherein the emulsion is free from weighting agents.

Particularly preference is made to
preservatives selected from the group consisting of potassium or sodium sorbate, sodium benzoate or mixtures thereof, a surfactant which is gum arabic, modified gum arabic, modified starch, quillaja extract, whey protein concentrate, sodium stearoyl lactylate, phospholipids, polysorbate, hyproxypropyl methyl cellulose, carboxy methyl cellulose, sucroglycerides;

acidulants selected from the group consisting of citric acid; malic acid, tartaric acid, lactic acid or mixtures thereof.

Emulsions of the present invention comprising the said triglycerides and said additives advantageously provide a stable specific turbidity which is preferably more than 350 NTU (ratio), preferably more than 400 NTU (ratio), more preferred more than 415 NTU (ratio) (Nephelometric Turbidity Unit). Preferably specific turbidity is from 350 NTU (ratio) to 600 NTU (ratio) preferably from 400 NTU (ratio) to 550 NTU (ratio), more preferred from 400 NTU (ratio) to 500 NTU (ratio).

In a preferred embodiment of the emulsion of the present invention, the particle size distribution is from 0.01 µm to 1 µm, preferably 0.1 µm to 0.5 µm, more preferred 0.1 µm to 0.35 µm, preferably measured by laser diffraction according to ISO 13320:2009 and ISO 9276-2:2014.

Particle size distribution in an emulsion is an important parameter which contributes to the specific turbidity and creaming stability of an emulsion. The creaming stability of the inventive emulsion and the resultant end-product (e.g. foodstuff, beverages) is advantageously achieved through the interactions of the amounts of the fat phase, the viscosity and the density difference of a specific particle size and particle size distribution in an emulsion which are here adjusted.

A further aspect of the present invention is the use of the emulsion of the present invention to turbid beverages and foodstuffs.

The emulsion of the present invention as described herein has the advantages of being storage stable and providing a high specific turbidity, thus when including in foodstuffs or beverages which are to be cloudy, the emulsion induce a stable and visually cloud to foodstuffs and beverages.

As used herein, "beverage" refers to, without limitation, carbonated drinks, e.g. non-alcoholic beverages, soft drinks, soda pop, tonic, fruit drinks, alcoholic beverages, smoothie beverages, protein drinks, shakes, vegetable juice drinks, dairy-based drinks, coffee and tea-based drinks and any other beverage to which a degree of cloud is desirable; "beverage" also refers to any drink which contains suspended solids. As used herein, "smoothie" and "smoothie beverage" are used interchangeably and refer to beverages with a characteristic thickness which can be attributed to the presence therein of ingredients such as sweeteners, acids, vitamins, fibre, fruit juice, fruit puree, milk, milk solids, milk proteins, soy milk, soy proteins, coffee, coffee solids, vegetable juice, vegetable puree, tea, tea solids, preservatives, buffers, colours, flavours, and combinations thereof. Smoothie beverages may be fruit-based, juice-based, dairy-based, coffee-based, soy-based, vegetable-based, tea-based or a combination thereof.

The beverage products disclosed here optionally contain additional ingredients, including, for example, flavourings such as natural fruit flavours, botanical flavours, other flavours, and mixtures thereof. As used here, the term "fruit flavour" refers generally to those flavours derived from the edible reproductive part of a seed plant. Included are both those wherein a sweet pulp is associated with the seed, e.g., banana, tomato, cranberry and the like, and those having a small, fleshy berry. The term berry also is used here to include aggregate fruits, i.e., not "true" berries, but fruit commonly accepted as such. Examples of suitable fruit or berry sources include whole berries or portions thereof, berry juice, berry juice concentrates, berry purees and blends thereof, dried berry powders, dried berry juice powders, and the like.

Exemplary fruit flavours include the citrus flavours, e.g., orange, lemon, lime, tangerine, mandarin orange, tangelo, pomelo, and grapefruit, and such flavours as apple, grape, cherry, and pineapple flavours and the like, and mixtures thereof. In certain exemplary embodiments the beverage concentrates and beverages comprise a fruit flavour component, e.g., a juice concentrate or juice. As used here, the term "botanical flavour" refers to flavours derived from parts of a plant other than the fruit. As such, botanical flavours can include those flavours derived from essential oils and extracts of nuts, bark, roots and leaves. Examples of such flavours include cola flavours, tea flavours, coffee flavours and the like, and mixtures thereof. The flavour component can further comprise a blend of several of the above-mentioned flavours. The particular amount of the flavour component useful for imparting flavour characteristics to the beverages of the present invention will depend upon the flavour(s) selected, the flavour impression desired, and the form of the flavour component. Those skilled in the art, given the benefit of this disclosure, will be readily able to determine the amount of any particular flavour component(s) used to achieve the desired flavour impression.

Juices suitable for use in at least certain exemplary embodiments of the beverage products disclosed here include, e.g., fruit, vegetable and berry juices. Juices can be employed in the present invention in the form of a concentrate, puree, single-strength juice, or other suitable forms. The term "juice" as used here includes single-strength fruit, berry, or vegetable juice, as well as concentrates, purees, milks, and other forms. Multiple different fruit, vegetable and/or berry juices can be combined, optionally along with other flavourings, to generate a beverage having the desired flavour. Examples of suitable juice sources include plum, prune, date, currant, fig, grape, raisin, cranberry, pineapple, peach, banana, apple, pear, guava, apricot, saskatoon berry, blueberry, plains berry, prairie berry, mulberry, elderberry, Barbados cherry (acerola cherry), choke cherry, date, coconut, olive, raspberry, strawberry, huckleberry, loganberry, currant, dewberry, boysenberry, kiwi, cherry, blackberry, quince, buckthorn, passion fruit, sloe, rowan, gooseberry, pomegranate, persimmon, mango, rhubarb, papaya, litchi, lemon, orange, lime, tangerine, mandarin orange, tangelo, pomelo, and grapefruit etc. Numerous additional and alternative juices suitable for use in at least certain exemplary embodiments will be apparent to those skilled in the art given the benefit of this disclosure. In the beverages of the present invention employing juice, juice may be used, for example, at a level of at least about 0.1% by weight of the beverage. In certain exemplary embodiments juice is employed at a level of from about 0.1% to about 45% by weight of the beverage. Typically, juice can be used, if at all, in an amount of from about 3% to about 10% by weight.

Certain such juices which are lighter in colour can be included in the formulation of certain exemplary embodiments to adjust the flavour and/or increase the juice content of the beverage without darkening the beverage colour. Examples of such juices include apple, pear, pineapple, peach, lemon, lime, orange, apricot, grapefruit, tangerine, rhubarb, cassis, quince, passion fruit, papaya, mango, guava, litchi, kiwi, mandarin, coconut, and banana. Deflavoured and decoloured juices can be employed if desired.

Other flavourings suitable for use in at least certain exemplary embodiments of the beverage products disclosed here include, e.g., spice flavourings, such as cassia, clove, cinnamon, pepper, ginger, vanilla spice flavourings, cardamom, coriander, root beer, sassafras, ginseng, and others. Numerous additional and alternative flavourings suitable for use in at least certain exemplary embodiments will be apparent to those skilled in the art given the benefit of this disclosure. Flavourings can be in the form of an extract, oleoresin, juice concentrate, bottler's base, or other forms known in the art. In at least certain exemplary embodiments, such spice or other flavours complement that of a juice or juice combination.

The beverage products disclosed here optionally may contain other additional ingredients, including, generally, any of those typically found in beverage formulations. These additional ingredients, for example, can typically be added to a stabilized beverage formulation. Examples of such additional ingredients include, but are not limited to, flavours, sugars, sweeteners, fruit ingredients, lipids, colours, vitamins, antioxidants, botanicals, extracts, caramel and other colouring agents or dyes, (anti-) foaming agents, emulsifiers, tea solids, and mineral and non-mineral nutritional supplements. Examples of non-mineral nutritional supplement ingredients are known to those of ordinary skill in the art and include, for example, antioxidants and vitamins, including Vitamins A, D, E (tocopherol), C (sodium ascorbate), B (thiamine), $B_2$ (riboflavin), $B_6$, $B_{12}$, and K, niacin, folic acid, biotin, and combinations thereof. The optional non-mineral nutritional supplements are typically present in amounts generally accepted under good manufacturing practices.

Suitable sweeteners may be used including artificial and natural sweeteners, nutritive and non-nutritive sweeteners.

As used herein, "foodstuff" refers to, without limitation, both solid and liquid ingestible materials for man or animals, which materials usually do, but need not, have nutritional value. Thus, foodstuffs include gravies, soups, convenience foods, milk and dairy products, spreads, and the like.

Therefore another important aspect of the present invention is a beverage, comprising
  i) an emulsion according to the present invention,
  ii) additives selected from the group consisting of flavours, sugars, sweeteners, salt, fruit or vegetable ingredients, lipids, colours, vitamins, antioxidants, botanicals, extracts or mixtures thereof, and
  iii) water.

Preferably the amount of the emulsion according to the present invention in a beverage or foodstuff is from 0.001 wt. % to 5 wt. %, preferably from 0.01 wt. % to 2.0 wt. %, based on the total amount of the beverage.

Another object of the present invention are creamers, instant powders, effervescent tablets, (instant) soups comprising an emulsion according to the present invention.

Another important object of the present invention is the method of producing the inventive emulsion to obtain suitable emulsions which provide appropriate specific turbidity from 350 NTU (ratio) to 600 NTU (ratio), preferably from 400 NTU (ratio) to 550 NTU (ratio), more preferred from 400 NTU (ratio) to 500 NTU (ratio).

Therefore the invention is also directed to a method for producing an emulsion of the present invention, comprising A) heating the long chain triglycerides (compound i) to the melting point,
B) providing an aqueous phase, which comprises water and additives (compounds ii and iii) and heating the aqueous phase to the same temperature as in step A), then
C) mixing the aqueous phase with the melted mixture of step A),
D) high-pressure homogenizing of the mixture of step C) at a main pressure from 100-500 bar, preferably 200-400 bar, more preferred 300-400 bar;
E) finally rapid cooling down of the mixture of step D) to a temperature from −50° C. to 10° C., preferably from −10° C. to 5° C., more preferred from −5° C. to 4° C.

Within the scope of the present invention the term "rapid cooling" means that the cooling step is performed, in which the mixture is cooled within 1 to 4° C./min.

Surprisingly, it has been observed that the crystallization has to be controlled to obtain suitable emulsions in the sense of the present invention.

E.g. to prevent premature crystallization the homogenizer using in step D) may be preferably be preheated with hot water. Further, the emulsion resultant from step D) should be cooled immediately in an ice bath below crystallization temperature of the triglyceride derivatives in the continuous phase to induce crystallization (step E). Especially surprisingly, after fast cooling the resulting dispersion is more stable. The dispersions may then be spray dried or not.

EXAMPLES

Example 1

Emulsion Preparation

Emulsions A-E (Table 1) have been prepared via high pressure homogenization. Aqueous surfactant solutions were prepared by mixing the specified amount of emulsifier in filtered water at room temperature and 2000 rpm until the emulsifier dispersed completely. An adequate amount of preservative commonly used in beverage industry, for example 0.013% of a 20% potassium sorbate solution and 0.015% of a 50% citric acid solution can be added to prevent microbial growth. If the final dispersion is spray dried preservative is only added if needed. For emulsification the aqueous phase is heated above the melting point of used lipid (e.g. 10° C. higher) and stirred. Parallel the lipid is fully molten in a hot water bath approximately 10° C. above melting temperature. To obtain a pre-emulsion, the hot lipid and aqueous phases are mixed together with a high shear mixer at approx. 6000 rpm for approx. 5 minutes or a similar device. Next, the pre-emulsion can be stirred until the air has escaped, thereby maintaining the temperature above the melting point of the lipid. Homogenization can be undertaken with high pressure homogenization at different pressure combinations running several cycles (for example 500 bar, 3 cycles) or with any other suitable device reducing the mean Sauter diameter of the particle size distribution below 0.5 μm (preferably between 0.1 μm 0.35 μm) and at least 90% of the volume distribution is smaller than hum ($\bar{x}90.3.<1$ μm). To prevent premature crystallization the homogenizer can be preheated with hot water. Finally, the emulsion is cooled immediately in an ice bath below crystallization temperature of the fat in the continuous phase to induce crystallization. The dispersions may be spray dried then. Recrystallization is effectively arrested in spray dried state (see FIG. 1).

TABLE 1

Emulsions A-C (all concentrations in wt.-%)

| Ingredients | Emulsion A | Emulsion B | Emulsion C |
| --- | --- | --- | --- |
| MCT | 7.2 | — | — |
| Dynasan P60 | — | 6.7 | — |
| Dynasan P118 | — | — | 6.6 |
| Acidulants | 0.015 | 0.015 | 0.015 |
| Preservatives | 0.013 | 0.013 | 0.013 |
| Surfactants | 17.2 | 17.2 | 17.2 |
| Water | Add to 100 | Add to 100 | Add to 100 |

All concentrations of emulsifiers are related to the aqueous phase, the concentration of the lipid phase is related to total weight of the emulsion. The dispersed phase is balanced volumetrically as this is more relevant to compare turbidity between emulsions. As particle size has a huge impact on turbidity, only preparations of the same or nearly the same particle size were compared to each other.

Example 2

Particle Size Measurement

The particle size distribution in the present invention was measured using a Master-sizer 3000, Malvern. The instrument detects scattered light and calculates the particle size from the scattering pattern. The emulsions were analysed directly after preparation. Particle laser diffraction measurement was undertaken and reported following ISO 13320: 2009 and ISO 9276-2:2014. For each sample five measurements were made using the following parameters: pump speed was set at 2000 rpm, measurement delay was 2 seconds, measurement time was 10 seconds and 10,000 snaps were taken. The refractive index is adjusted for the different dispersed phases respectively according to table 2. Homogenization conditions have been varied so that particle size distributions were gained which are as coinciding as possible. The results are summed up in table 2. The Sauter mean diameter x1,2 ranges between 0.1 μm 0.32 μm.

Example 3

Turbidity Measurement

Emulsions were diluted (2:1000) with filtered water for measurement of turbidity and left to settle for approx. 30 minutes prior to turbidity measurement. A scratch-free cuvette was first washed with deionized water followed by the sample to be measured. Turbidity was measured using a 2100AN IS laboratory turbidimeter DIN EN ISO 27027: 2000-04 compatible with infrared light source at 870 nm±30 LED (Hach Lange GmbH, Berlin, Germany) with 25 mm round cuvette, 30 mL. The measurement was carried out in NTU (ratio) mode and done in triplicate. The results are reported in Table 2 and visualized depending on the melting point of the dispersed phase in FIG. 2. Further, in FIG. 1 can be seen that turbidity increases significantly with increasing melting point of the dispersed phase.

TABLE 2

Physical parameters of emulsions A-C

|  | Emulsion A | Emulsion B | Emulsion C |
|---|---|---|---|
| Turbidity [NTU (ratio)] n = 3 | 240 | 426 | 473 |
| x1,2 [μm] n = 5 | 0.13 | 0.25 | 0.10 |
| Melting point [° C.] | −5 | 59 | 74 |
| Refractive index | 1.45 | 1.51 | 1.52 |

Example 4

Differential Scanning Calorimetry

To determine the melting and crystallization behaviour of lipids in emulsions, the samples were analysed via differential scanning calorimetry with a DSC 200 F3 Maia, Netzsch. As water interferes with the results, samples have been centrifuged and dried prior to measurement. 7-8 mg of dried sample was weighted in aluminium pans which were heated up from 0° C. to 100° C. with a heating rate of 5° C./min and then cooled down to 0° C.

Surprisingly, when the emulsions B-C are cooled down, during the producing process (example 1), in an ice bath at 4° C., the recrystallization is slowed down and the dispersion is stable for two weeks as depicted in FIG. 3. In case the sample is cooled down at 4° C. and stored at 4° C. there is still no sign of recrystallization after 4 weeks (FIG. 4). As long as there is no recrystallization the obtained beverage cloud is stable for more than 3 months in a standard carbonated beverage base (0.2% dosage, 10° Brix, 0.15% citric acid).

Example 5

Storage Stability

The stability test has been performed for the emulsions A-C, wherein the emulsions have been stored at room temperature and the specific turbidity (NTU) is observed. The turbidity of the inventive emulsion has not changed within 12 weeks at a temperature of 23°, which show that the emulsion is stable. The results are shown in Table 3:

TABLE 3

Storage stability

| Week | Emulsion A [NTU(ratio)] | Emulsion C [NTU(ratio)] |
|---|---|---|
| 0 | 232 | 471 |
| 2 | 232 | 475 |
| 4 | 232 | 479 |
| 6 | 232 | 482 |
| 8 | 232 | 475 |
| 10 | 232 | 473 |
| 12 | 232 | 474 |

Example 6

Beverage Preparations

An ISO-drink has been prepared with: 91.8% carbonated water, 8% ISO-Compounds and 0.2% Emulsion A to C. The drink containing the emulsion A in contrast to the drinks containing the emulsions B to C, does not show as high specific turbidity as the drinks containing emulsion B-C.

The invention claimed is:

1. A consumable emulsion, comprising:
   i) 3 wt. % to 12 wt. % long chain triglycerides selected from the group of fatty acids consisting of
      a) C18,
      b) C16:C18 in the ratio of 45:55,
      c) C14:C16:C18 in the ratio of 1:44:53, and mixtures thereof,
   ii) 97 wt. % to 70 wt. % water,
   iii) 0.013 wt. % to 20 wt. % additives which are selected from the group consisting of preservatives, surfactant, acidulants and emulsifiers, and
   wherein the weight percent of the components i) to iii) are based on the total amount of the emulsion, and
   the emulsion is free from weighting agents, and wherein the specific turbidity of the emulsion is from 350 to 600 NTU (ratio) (Nephelometric Turbidity Unit).

2. The emulsion of claim 1, wherein the long chain triglycerides are triglycerides of long chain fatty acid residues derived from fatty acids having from 14 to 18 carbon atoms, and selected from the group consisting of non-hydrogenated, partially hydrogenated or fully hydrogenated oils which are selected from the group consisting of soybean, safflower, sunflower, high oleic sunflower, sesame, peanut, corn, olive, rice bran, babassu nut, palm, mustard seed, cottonseed, poppyseed, low or high erucic rapeseed, shea, marine, meadowfoam, tallow, lard, shea butter, dairy butter, jojoba and mixtures thereof.

3. The emulsion of claim 1, wherein the long chain triglycerides are derived from any synthetic or natural, straight or branched, saturated or unsaturated, organic acid.

4. The emulsion of claim 1, wherein the additives are selected from preservatives, surfactants and acidulants.

5. The emulsion of claim 1, wherein the particle size distribution is from 0.01 μm to 1 μm, measured by particle laser diffraction.

6. The emulsion of claim 3, wherein the long chain triglycerides are selected from the group consisting of palmitic (hexadecanoic), stearic (octadecanoic), and mixtures thereof.

* * * * *